UNITED STATES PATENT OFFICE.

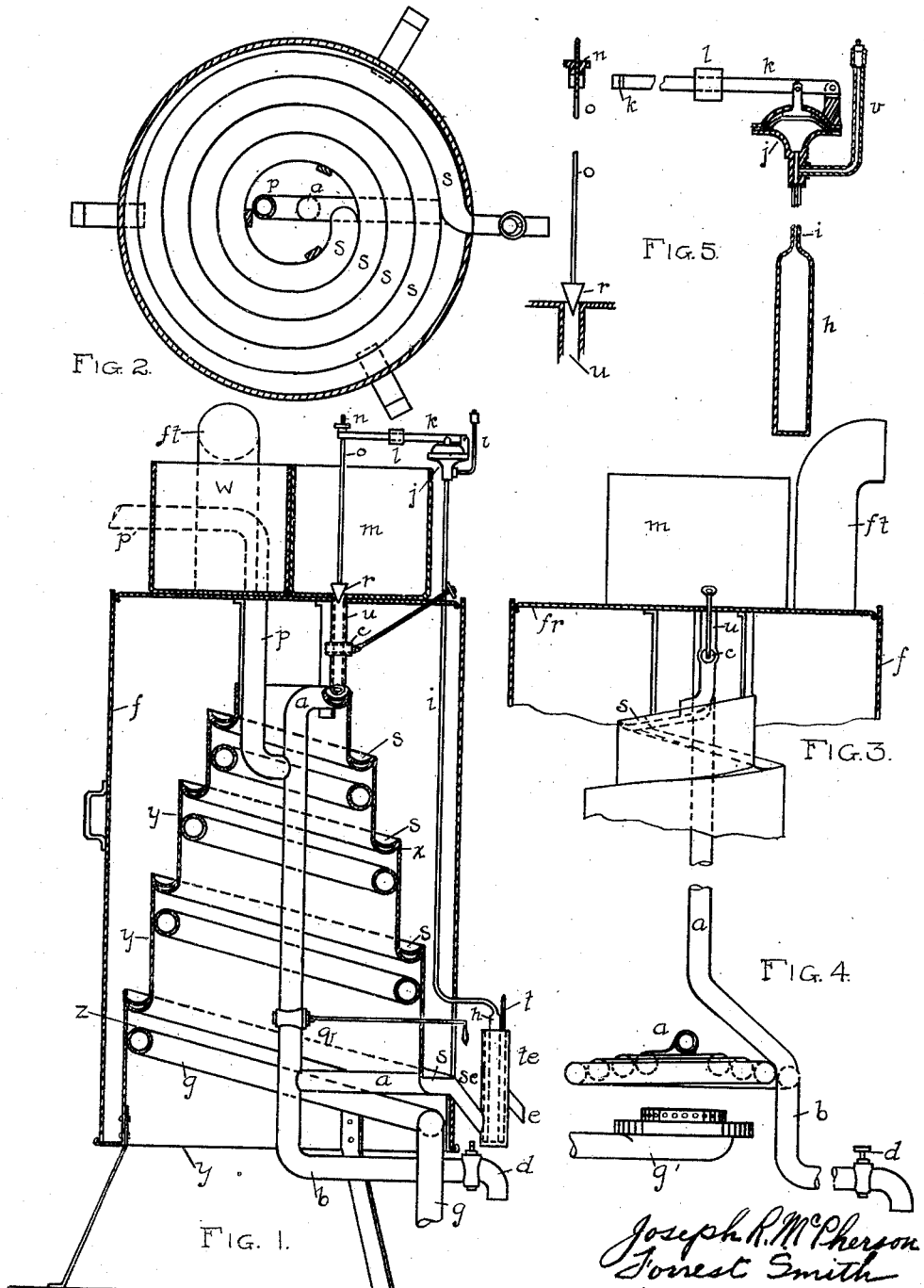

JOSEPH R. McPHERSON AND FORREST SMITH, OF COUNCIL BLUFFS, IOWA, ASSIGNORS TO McPHERSON PASTEURIZER COMPANY, OF COUNCIL BLUFFS, IOWA.

PASTEURIZER AND COOLER.

983,561. Specification of Letters Patent. Patented Feb. 7, 1911.

Application filed April 24, 1909. Serial No. 492,084.

*To all whom it may concern:*

Be it known that we, JOSEPH R. MCPHERSON and FORREST SMITH, citizens of the United States, residing at Council Bluffs, in the county of Pottawattamie and State of Iowa, have invented a new and useful Pasteurizer and Cooler, of which the following is a specification.

Our invention relates to improvements in pasteurizers and coolers adapted to heat liquids to a desired temperature and providing a means for rapidly and conveniently cooling such liquids; and the objects of our invention are, first, to provide a means for rapidly bringing the temperature of a liquid to a given temperature without heating any portion of the same to a higher temperature than is necessary to pasteurize or sterilize it; second, to provide a means whereby a liquid as milk may be rapidly pasteurized or sterilized by a uniform heat in its passage from one receptacle to another; third, to provide such a machine that there will be the least possible agitation of the milk or liquid in its flow over the sterilizing surface; fourth, to provide a better distribution of the heat to the sterilizing means; fifth, to provide a natural circulation of the heat maintaining an equal temperature as far as possible on the sterilizing surfaces; sixth, to provide an automatic means of regulating the temperature of pasteurization or sterilization; seventh, to provide in the same apparatus a means for cooling and aeration, which may also be a requisite of pasteurization. We attain these objects by the structure illustrated in the accompanying drawing, in which—

Figure 1 is a cross section of the apparatus; Fig. 2 is a plan of the apparatus shown in Fig. 1 with the tanks removed; Fig. 3 is a side elevation of the tanks and a portion of a spiral of the apparatus; Fig. 4 shows a modified form of the circulator; Fig. 5 is a detailed representation and cross section of temperature regulator.

Similar letters refer to similar parts throughout the several views.

In pasteurizing or sterilizing apparatus the surface against which the liquid to be sterilized comes in contact must be kept uniform within a limited degree of temperature or portions and particles of the liquid will be overheated or scorched and injured. Water or some suitable liquid is usually employed for this purpose and steam or vapor may be employed. In other machines heretofore constructed a large body of water has usually been employed, requiring much fuel to heat and more time and trouble necessary to pasteurize or sterilize, which to be practical must be accomplished in a very short time. It is desirable too, in pasteurizing or sterilizing such liquids as milk while they flow to have as little breaking up and agitation of the globules as possible, the agitation tending to injure the cream-raising qualities of the milk. It is necessary and desirable to have a rapid and complete circulation of the water, liquid or vapor used to maintain the equality of temperature.

Fundamental in our invention is the use of a tube $s$ adapted to carry the water, steam or other heat medium and having a surface of concave or other suitable form to carry the liquid to be treated. This tube $s$ can be of any convenient shape but for convenience of arrangement and construction we prefer to use the same in a spiral form and the tube $s$ will be hereafter referred to as the spiral $s$. It is obvious that the spiral might be constructed of uniform size and in a variety of forms and may be formed between an inner and outer casing, but for convenience and cleanliness the form of a decreasing spiral is preferable. The spiral $s$ is filled with water, vapor, steam or other suitable heat medium $x$, and for the purposes of circulation, the pipe $a$ connects with the extremities of the spiral $s$. A suitable tank $m$ is provided to hold the liquid to be treated and a curved pipe $u$ having a suitable cut-off $c$ is arranged to deposit the liquid at the top of the spiral $s$. The tank $w$ has a pipe $p$ connecting with the pipe $a$ to allow proper expansion into the tank $w$ of the water or heat medium $x$, in the coil $s$ and connecting pipes, and when vapor or steam is employed the tank may be dispensed with and vapor or steam supplied through the pipe $b$. To prevent the hottest liquid circulating into the tank $w$ the pipe $p$ enters the pipe $a$ at a point below the highest point of the pipe $a$. When water or other liquid is used, underneath the coil $s$ a suitable burner $g$ for gas or other combustible is placed, whose coils correspond to the coils of the spiral $s$, the burner pipe $g$ being supplied with suitable apertures $z$ through which the combustible is allowed to escape for ignition. The burner $g$ may be supplied with any ordinary gas or furnished with or be adapted to any suitable combustible, as may be desired. The pipe $a$ may be formed into a suitable coil as shown in Fig. 4, being supplied with an ordinary burner $g'$ underneath, which may take the place of the coil burner $g$ if desired. From the end of the spiral $s$ a tube $s\ e$ communicates with an upright tube $t\ e$, the tube $t\ e$ being arranged to hold a thermometer $t$ and the bulb of a thermal regulator $h$. The outlet of the tube $t\ e$ being the tube or spout $e$, from which latter the treated product escapes. The tube $e$ is placed with its lower side slightly below the escape of the spiral $s$ into the tube $s\ e$ so that the escaping sterilized fluid must rise about the thermal regulator bulb $h$ and the thermometer $t$ before escaping through the tube $e$. The thermal regulator bulb is connected by suitable tubing $i$ with a diaphragm $j$ which is arranged to act upon a lever $k$. The extension $v$ is stopped by a plug and the bulb $h$ and the pipe $i$ is filled with any suitable expansive fluid. Upon the lever $k$ may be placed a weight $l$ to vary the action by the expansion of the liquid in the bulb $h$. A valve $r$ partially or wholly closes the orifice of the pipe $u$ into the tank $m$ and is provided with a wire $o$ and a nut $n$ to adjust the position of the valve $r$ with reference to the movement of the lever $k$. The lever $k$ may be slotted to receive the wire $o$ from the end so that the same may be easily removed for the purpose of removing the tank $m$ for cleaning and filling. The cut-off $q$ may be placed in the pipe $a$ when it is desirable to use the apparatus for cooling and aerating. Also the pipe $a$ may be extended to the pipe $p$ having a suitable cut-off or faucet $d$ for the purpose of draining and to use when the device is used for cooling and aerating. The spiral $s$ may be suitably inclosed and supported by a spiral sheet of metal $y$ formed or attached to the edges of the spiral and which may be used to inclose the heating coil or heater $g$ and the spiral $s$; and because of its being conical in form very little heat from the burner is wasted, all heat being communicated to the spiral $s$ by the shield $y$.

A suitable cover may be provided to keep out dirt and contamination. We preferably employ a circular shield $f$ which may be removed over the top of the apparatus, the support $f\ r$ for the tanks $w$ and $m$ forming the top of cover, the shield $f$ being easily removed. By supplying an escape pipe $f\ t$, the expanded gases from the heater $g$ or $g'$ together with odors from the liquid to be treated are carried off through the escape pipe $f\ t$.

By the use of the decreasing spiral $s$ combined with the shield $y$, the apparatus is easily cleaned and leaves no interstices to hold dirt and contamination.

The fluid desired to be treated is placed in the tank $m$. The cut-off $c$ is opened sufficiently to allow the same to pass on to the spiral $s$ at its highest point. By reason of gravity it then pursues the course provided on the spiral $s$ without disturbance continuing on down into the tube $s\ e$ and through the vertical tube $t\ e$ out through the spout $e$ where it may be properly received after being treated. By reason of heat from the heater $g$ or $g'$ the water or other liquid, vapor or steam $x$ in the coil $s$ and the connecting pipe $a$ is heated to the necessary temperature, for pasteurization or sterilization. Upon being heated the water will ascend through the spiral and as it cools will be circulated through the spiral and the connecting pipes $a$. Thus the heating medium $x$ will cause the surface of the coil to remain at nearly a uniform temperature. When the burner $g'$ is used, the water or heating medium will be caused to rise through the tube $a$ and spiral $s$ to the top of the same and descend as it is cooled and circulate back through the tube $a$. The temperature of the pasteurized or sterilized fluid passing into the tube $t\ e$ will cause the fluid in the bulb $h$ to expand and acting upon the diaphragm $j$ will move the lever $k$ and operate the valve $r$ to increase or lessen the flow of the fluid, the same being properly adjusted for a given temperature.

A thermometer $t$ may be placed in the tube $t\ e$ to show the operator the temperature of the outcoming fluid by which he can ascertain whether the same is sufficient for the purposes desired and to enable him to properly regulate the flow. The flow can also be regulated by using the stop $c$, making it unnecessary to use the automatic regulator having the bulb $h$, the automatic regulator having the bulb $h$ being an additional device to aid the operator in keeping a uniformity of temperature within the limits of heat regulation, which may be fixed in the beginning at a desired temperature.

When it is desired to use the apparatus for cooling and aerating the heat is turned off from the burners or the steam or vapor from the pipes, the valve $q$ is closed by the handle $q'$ and the cut-off $d$ is opened. A suitable supply of cold water or refrigerating means at the desired temperature is supplied to the tank $w$ or to the pipe $p'$, which will flow through the pipe $p$, the pipe $a$ and the coil $s$ out through the pipe $b$ and the faucet $d$, or the supply may enter through the pipe $b$ passing upward through the spiral $s$ and into the tank $w$ or out through a suitable pipe $p'$. When the coil $s$ is at the proper temperature the valve $c$ may be opened to allow the fluid to pass on to the spiral $s$, to be cooled, and the heat from the same will be absorbed by the refrigerating fluid or other medium $x$ passing through the spiral $s$. Thus the same apparatus may be used to pasteurize or sterilize and then aerate and cool the treated liquid or it may be used for either purpose alone.

What we claim is:—

1. In a pasteurizer or sterilizer for liquids, a spiral tube or conduit having a concave surface adapted to receive and convey a stream of liquid and adapted to hold within it a heat medium, means for heating the same, and a tube connecting the upper end of said spiral with the lower end thereof.

2. In a pasteurizer or sterilizer for liquids, a spiral tube or conduit having a concave surface adapted to receive and convey a stream of liquid and adapted to hold within it a heat medium, means for heating the same, a tube connecting the upper end of said spiral with the lower end thereof and a tank connected with said connecting tube at a point between the extremes of said connecting tube.

3. In a pasteurizer or sterilizer for liquids, a spiral tube or conduit having a concave surface adapted to receive and convey a stream of liquid and adapted to hold within it a heat medium, means for heating the same, a tube connecting the upper end of said spiral with the lower end thereof, a tank connected with said connecting tube intermediate the ends thereof, and a means for draining and drawing off from said tubes the heat medium within said tubes and spiral.

4. In a pasteurizer or sterilizer for liquids, the combination of a spiral tube having a concave surface and a tube connecting the opposite ends thereof, and means for heating a heat medium within said tube, a means for applying liquid to said concave surface, a means for drawing off the sterilized liquid, and a cut-off in said connecting tubes to vary the circulation of a heat medium within said spiral.

5. In a pasteurizer or sterilizer for liquids, the combination of a spiral tube or conduit having a concave surface, and a pipe connecting the ends thereof, a tank connected to said pipe intermediate its extremes, a tank and tube arranged to supply liquid to the concave surface of said spiral and a means for drawing off the liquid when sterilized.

6. In a pasteurizer or sterilizer for liquids, the combination of a spiral tube or conduit having a concave surface, and a pipe connecting the ends thereof, a tank connected to said pipe, a tank and tube arranged to supply liquid to the concave surface of said spiral, a means for drawing off the liquid when sterilized, and a thermal regulator regulating the supply of liquid upon said spiral.

7. In a pasteurizer or sterilizer for liquids, the combination of a spiral tube or conduit having a concave surface, and a pipe connecting the ends thereof, a tank connected to said pipe intermediate its extremes, a tank and tube arranged to supply liquid to the concave surface of said spiral, a means for drawing off the liquid when sterilized, a thermal regulator regulating the supply of liquid upon said spiral and a removable cover or shield enveloping said spiral.

8. In a pasteurizer or sterilizer, the combination of a spiral tube or conduit having a concave surface adapted to receive and carry a stream of liquid, said spiral connected by tubing at both ends and adapted to hold a cooling medium within said spiral, a means of supplying liquid to the concave surface of said tube and of drawing off the same, a tank supplying said cooling medium and a cock to draw off the same.

9. In a pasteurizer or sterilizer, the combination of a spiral tube or conduit having a concave surface adapted to receive and carry a stream of liquid, said spiral connected by tubing at both ends and adapted to hold a cooling medium within said spiral, a means of supplying liquid to the concave surface of said tube and of drawing off the same, a tank supplying said cooling medium, a cock to draw off the same and a removable cover or shield enveloping the said conduit.

JOSEPH R. McPHERSON.
FORREST SMITH.

Witnesses:
HENRY PETERSON,
ETHEL INGRAHAM.